(12) United States Patent
Shirai

(10) Patent No.: US 6,750,993 B1
(45) Date of Patent: Jun. 15, 2004

(54) DENSITY CALIBRATION CHART

(75) Inventor: Shu Shirai, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 573 days.

(21) Appl. No.: 09/659,578

(22) Filed: Sep. 11, 2000

(30) Foreign Application Priority Data

Sep. 10, 1999 (JP) .............................. 11-257422

(51) Int. Cl.⁷ ................................. H04N 1/04
(52) U.S. Cl. ................. 358/504; 358/1.9; 358/406; 358/1.2
(58) Field of Search ................. 358/1.9, 1.13, 358/523, 524, 3.01, 3.02, 504, 518, 406, 1.2

(56) References Cited

U.S. PATENT DOCUMENTS 6,204,873 B1 * 3/2001 Shimazaki ................. 347/172
6,473,197 B1 * 10/2002 Shimazaki ................. 358/1.9

* cited by examiner

*Primary Examiner*—Kimberly Williams
*Assistant Examiner*—Negussie Worku
(74) *Attorney, Agent, or Firm*—Sughrue Mion, PLLC

(57) ABSTRACT

A density calibration chart comprising color patches on which densities from the shadow to the highlight are printed in decreasing order, characterized in that said printed color patches are arranged in a check pattern.

5 Claims, 6 Drawing Sheets

DENSITY CALIBRATION CHART

| NO. | GRADATION | Y | M | C | K |
|---|---|---|---|---|---|
| 1 | 255 | | | | |
| 2 | 252 | | | | |
| 3 | 248 | | | | |
| 4 | 244 | | | | |
| 5 | 240 | | | | |
| 6 | 236 | | | | |
| 7 | 232 | | | | |
| 8 | 228 | | | | |
| 9 | 224 | | | | |
| 10 | 208 | | | | |
| 11 | 192 | | | | |
| 12 | 176 | | | | |
| 13 | 160 | | | | |
| 14 | 144 | | | | |
| 15 | 128 | | | | |
| 16 | 112 | | | | |
| 17 | 96 | | | | |
| 18 | 80 | | | | |
| 19 | 64 | | | | |
| 20 | 48 | | | | |
| 21 | 44 | | | | |
| 22 | 40 | | | | |
| 23 | 36 | | | | |
| 24 | 32 | | | | |
| 25 | 28 | | | | |
| 26 | 24 | | | | |
| 27 | 20 | | | | |
| 28 | 16 | | | | |
| 29 | 12 | | | | |
| 30 | 8 | | | | |
| 31 | 4 | | | | |
| 32 | 0 | | | | |

FIG. 1

DENSITY CALIBRATION CHART

| NO. | GRADATION |
|---|---|
| 1 | 255 |
| 2 | 252 |
| 3 | 248 |
| 4 | 244 |
| 5 | 240 |
| 6 | 236 |
| 7 | 232 |
| 8 | 228 |
| 9 | 224 |
| 10 | 208 |
| 11 | 192 |
| 12 | 176 |
| 13 | 160 |
| 14 | 144 |
| 15 | 128 |
| 16 | 112 |
| 17 | 96 |
| 18 | 80 |
| 19 | 64 |
| 20 | 48 |
| 21 | 44 |
| 22 | 40 |
| 23 | 36 |
| 24 | 32 |
| 25 | 28 |
| 26 | 24 |
| 27 | 20 |
| 28 | 16 |
| 29 | 12 |
| 30 | 8 |
| 31 | 4 |
| 32 | 0 |

FIG. 5

DENSITY CALIBRATION CHART

| ID NO. | DOT % | Y | M | C | K |
|---|---|---|---|---|---|
| MAXIMUM DENSITY | 100 % | | | | |
| MINIMUM DENSITY | 0 % | | | | |
| 1 | 100 % | | | | |
| 2 | 99.9 % | | | | |
| 3 | 99.3 % | | | | |
| 4 | 98.7 % | | | | |
| 5 | 95.0 % | | | | |
| 6 | 90.0 % | | | | |
| 7 | 83.7 % | | | | |
| 8 | 77.0 % | | | | |
| 9 | 68.7 % | | | | |
| 10 | 58.0 % | | | | |
| 11 | 43.6 % | | | | |
| 12 | 33.2 % | | | | |
| 13 | 19.8 % | | | | |
| 14 | 10.2 % | | | | |
| 15 | 6.8 % | | | | |
| 16 | 3.3 % | | | | |
| 17 | 0.7 % | | | | |
| 18 | 0.1 % | | | | |
| 19 | 0 % | | | | |

DENSITY CALIBRATION CHART

BACKGROUND OF THE INVENTION

The present invention relates to a method of constructing density calibration charts.

Density calibration is performed in order to correct the differences in sensitivity that exist between recording materials or printers. Even if one wants to print a density of 40%, the result is not always the same due to manufacturing errors inherent in recording materials and printers. Printing on a certain kind of recording material may give a density of 38% rather than 40% whereas printing on another kind of recording material may give a thicker density of 43%. The same applies to printers. A certain kind of printer may give a density of 38% rather than 40% but another kind of printer may give a thicker density of 43%.

Density calibration is necessary to make pre-press correction of such differences in sensitivity between recording materials or printers. The procedure of density calibration is as follows.

(1) First, with the printer (or recording material) of interest being initialized, print a density calibration chart (or a density test pattern which will be described later with reference to FIG. 5) on paper.

(2) Then, measure the color density on the printed density calibration chart either visually or with a densitometer 90 (see FIG. 2).

(3) The next step is correcting any color or density deviation on the basis of the result of color densitometry. To this end, correction data for printing in slightly darker or lighter densities is supplied to an editing device 10 (personal computer), particularly in a color density calibration 1D table in a data memory 107 (see FIG. 3), as well as into a color density calibration 1D table 3043 in a color printer 30 (see FIG. 4).

These three steps complete the process of density calibration.

(4) Image data is subsequently input to the editing device 10, which performs density conversion on the input image data with reference to the internal density calibration 1D table and the resulting correct data is sent to the printer (i.e., color printer) 30 for presswork.

If a printer which tends to print in darker shades receives data for printing a certain color at a density of 40%, the steps (1)–(4) allow for printing in a slightly reduced engine gradation, eventually yielding a print having the same density as the target. The same is true with a recording material.

The color printer 30 shown in FIG. 2 consists of a look-up table computing unit (hereunder referred to as "LUT") 31, a head driver 32, a head 33, a controller (CPU) 34, a motor driver 35 and a motor 36. LUT 31 generates strobe pulse widths ($\mu$s) corresponding to gradation values of 0–255 and is driven with the head driver 32 to impart a quantity of energy associated with the head 33. Details of the editing device 10 are shown in FIG. 3.

Connected to a system bus 106 in the editing device 10 are CPU 101, program memory 102, RAM 103, keyboard or mouse 104, display 105, data memory 107 and input/output interface circuit 108. Connected to the input/output interface circuit 108 are color scanner 99 and color printer 30. Programs as for percent dot area conversion and printer conditions correction computation are stored in the program memory 102. Image data, CMYK data, chart data and other kinds of data are stored in the RAM 103. Stored in the data memory 107 are a density calibration 1D (one-dimensional) table 1071 and a gray correction 1D table 1072. The density calibration 1D table 1071 contains inverse functions corresponding to a density calibration chart 80 shown in FIG. 2. In practice, data coming from the color scanner 99 passes through the input/output interface circuit 108 and the system bus 106 to enter the RAM 103, where it is corrected with the stored CMYK data before being output to the color printer 30. FIG. 4 shows the software configuration in the color printer 30.

As shown, the color printer 30 includes a color correction computing section 301, a data outputting section 302, a synthesis computing section 303 and a memory 304. The memory 304 has the following ready for use: printing conditions correction data 3041, standard colors transformation data 3042, density calibration 1D table 3043 and gray correction 1D table 3044; each of these data and tables consists of more than one unit. The data in the density calibration 1D table 3043 is input to the synthesis computing section 303, which is also supplied with the other elements to be corrected, i.e., printing conditions correction data 3041, standard colors transformation table 3042 and the data in the gray correction 1D table 3044, and the values obtained by computations for synthesis are sent to the color correction computing section 301, thereby constructing a composite look-up table 3011. The CMYK data coming from the editing device 10 is processed by computation for color correction which involves only one step of conversion with the look-up table 3011 and the result is output to the data outputting section 302.

FIG. 5 shows a conventional density calibration chart. As shown, the chart consists of four columns, Y, M, C and K, of squares that have been printed out and which are arranged stepwise from zero to a hundred percent in terms of density that corresponds to a designated percent dot; such squares are hereunder referred to as "color patches". In the density calibration chart shown in FIG. 5, the color patches for a maximum density (100%) are at the top of the columns and those for a minimum density (0%) are just below them in order to clearly mark off the density range. The intervening tones are arranged by density.

The arrangement of patches by density in a single column has one serious problem. If a denser patch which is upstream in the column is printed, the thermal head warms up and if it is immediately used to print the subsequent patch, the latter has a higher density than the target value, thus making it impossible to produce the desired calibration chart.

With a view to solving this problem, a calibration chart of the type shown in FIG. 6 has been developed. The obvious difference this chart and the one shown in FIG. 5 is that a patch in a denser area that has been printed is physically spaced from the next patch by a distance corresponding to the period over which the head cools down. The thermal head to which high energy has been applied to print the higher density patch cools down during that period and has returned to the initial temperature when the next patch is to be printed. The cool-down period is not necessary for printing patches of lower densities since no high energy is applied to the thermal head. In FIG. 6, the cool-down period is provided between patches having ID No. 1 (100% dot density) to ID No. 10 (58% dot density) but not between patches having ID No. 11 (43.6% dot density) to ID No. 19 (0% dot density).

In FIG. 6, the physical space corresponding to the cool-down period is held constant between patches of higher densities but if desired, it may be reduced with decreasing density.

Nevertheless, the provision of such cool-down periods unduly prolongs the density calibration chart, making it impossible to increase the number of patches that can be incorporated in the chart.

SUMMARY OF THE INVENTION

An object, therefore, of the present invention is to provide a density calibration chart that ensures adequate cool-down periods for the thermal head and which yet has no need to increase the space between patches.

This object can be attained by the density calibration chart according to the first aspect of the invention comprising color patches on which densities from the shadow to the highlight are printed in decreasing order, wherein that said printed color patches are arranged in a check pattern.

Preferably, the color patches are arranged on a plurality of columns for a color, and color patches of sequent density level are arranged on different columns.

The invention also provides a method of correcting density gradation which comprises performing density calibration using the density calibration chart.

The invention also provides a color printer which has a density calibration table capable of printing the density calibration chart.

Since the printed color patches are arranged in a check pattern, a sufficient period is provided to allow for the thermal head to cool down before it prints the next patch of lower density, thereby preventing it from being printed at a higher density than it should be. As a further advantage, there is no need to widen the space between patches, thus making it possible to increase the number of patches that can be incorporated in the density calibration chart.

BRIEF DESCRIPTION OF THE DRAWINGS

FIG. 1 is a density calibration chart according to an embodiment of the invention.

FIG. 5 shows a conventional density calibration chart.

DETAILED DESCRIPTION OF THE PREFERRED EMBODIMENT

Figure 2:
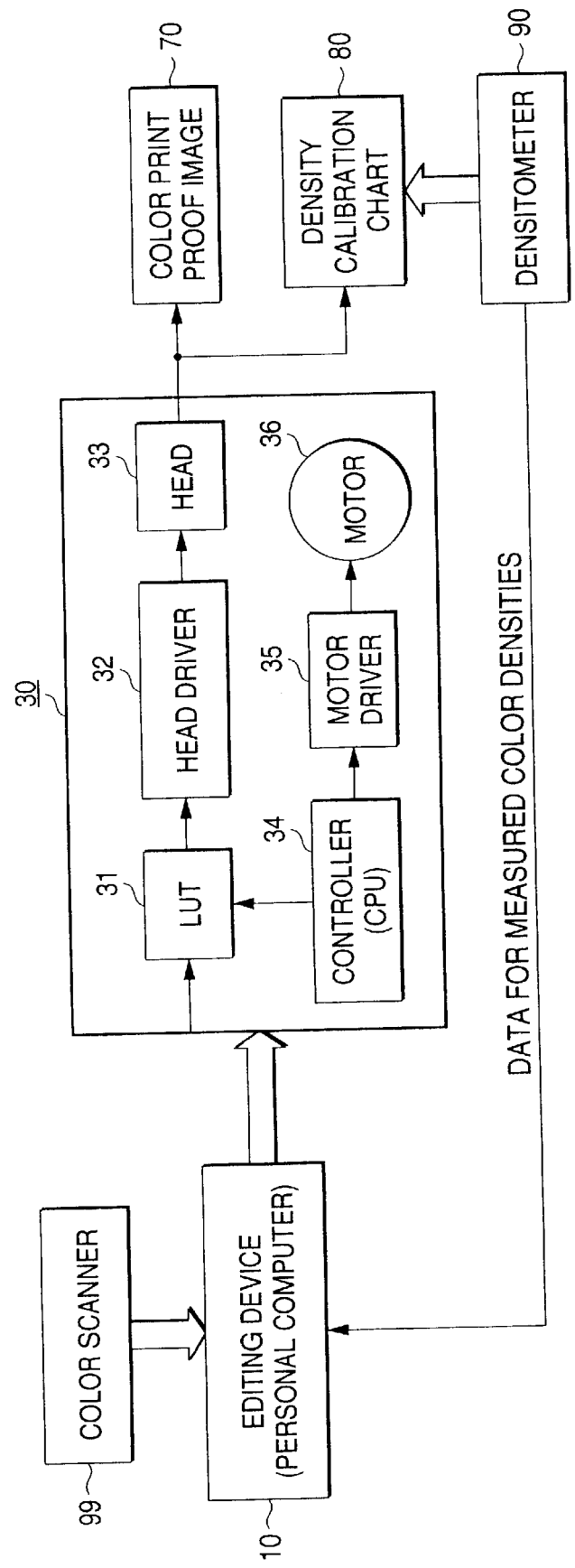
FIG. 2 illustrates how density calibration is performed.
Figure 3:
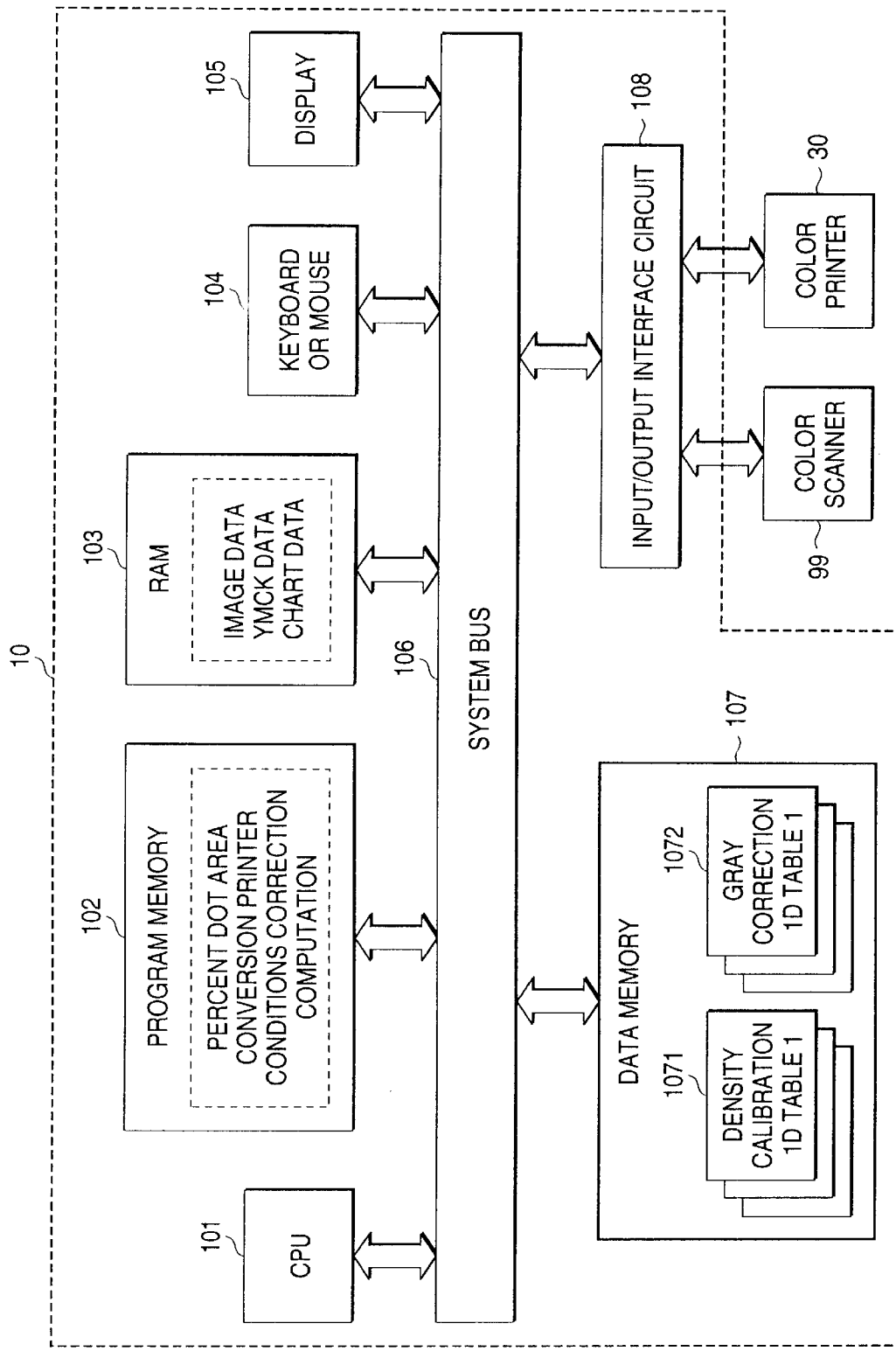
FIG. 3 shows the configuration of editing device 10.

The present invention is described below with reference to FIG. 1 which shows a mode of carrying it out. The density range from 100% to 0% for each of Y, M, C and K colors can be represented in a specified number of gradations. The density calibration chart shown in FIG. 1 represents 256 gradations, of which 32 are recorded on color patches. For each color, two columns of patches are provided side by side and as the density decreases from 100% to 0%, two patches are alternately used to record the color. For example, a patch on the right side is used to record K color at 100% density (gradation 255) and a patch on the left is used to record the next gradation 252. For recording the next gradation 248, a patch on the right side is used again. The advantage of this procedure is that even if the thermal head has become hot as the result of recording gradation 255, it will cool down as gradation 252 is recorded without using a patch on the right side. By the time the patch on the right side is used to record gradation 248, the thermal head has sufficiently cooled down to enable recording under the same conditions as in the initial case, thus providing the desired density.

In the conventional calibration chart shown in FIG. 5, color patches are arranged by density in a single column for each of Y, M, C and K colors. If a denser patch which is upstream in the column is printed, the thermal head warms up and if it is immediately used to print the subsequent patch, the latter has a higher density than the target value, thus making it impossible to produce the desired calibration chart. This is not the case of the present invention and the desired density can be attained since the patches of each color are arranged in a zigzag pattern in two columns.

Figure 6:
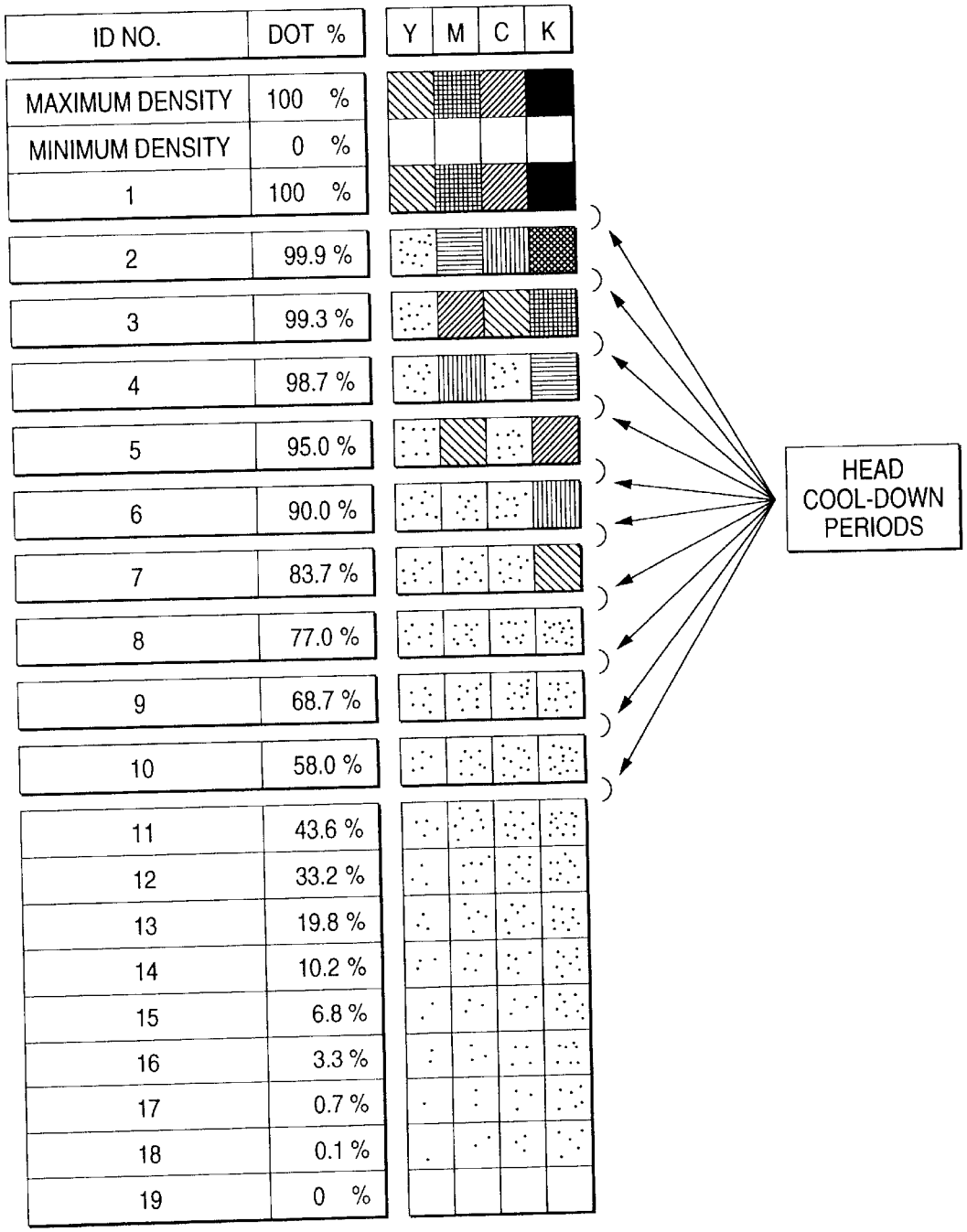
FIG. 6 shows another conventional density calibration chart which is an improved version of the chart shown in FIG. 5.

In the other conventional calibration chart shown in FIG. 6, the color patches in the high-density area are spaced apart by a distance corresponding to the cool-down period of the thermal head and this inevitably prolongs the density calibration chart, making it impossible to increase the number of patches that can be incorporated in the chart. In the present invention, the color patches are not spaced apart but are arranged in a zigzag pattern in two columns. This effectively prevents undue increase in the length of the density calibration chart, thus making it possible to increase the number of patches that can be incorporated in the chart.

While the foregoing description is focused on K color, it also applies to other colors Y, M and C. In the preferred mode of carrying out the invention, the patches of each color are arranged in two columns but this is not the sole case of the invention and they may be arranged in three or more columns and used in sequence in order to meet the demands for higher power output and faster recording.

Using the thus constructed density calibration chart, one can accomplish exact correction of density gradations by taking advantage of its ability to print in correct densities.

Figure 4:
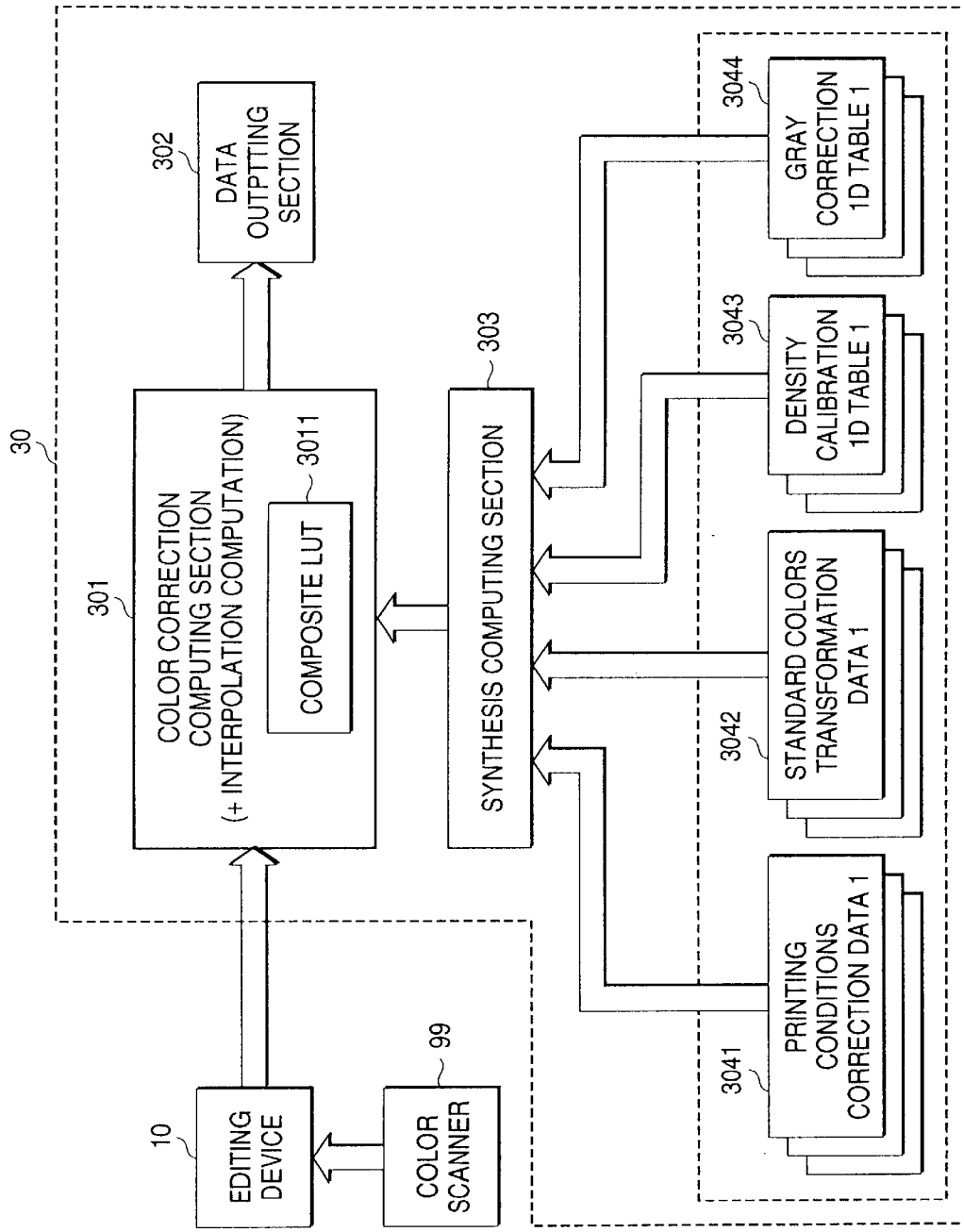
FIG. 4 shows the configuration of color printer 30.

If desired, a program for printing closely arranged color patches in two columns in a check pattern may be stored in the density calibration table 3043 in the color printer 30 (see FIG. 4), which can then automatically print a density calibration chart consisting of zigzag arranged color patches.

Thus, according to the present invention, color patches are arranged in a check pattern to enable the construction of a density calibration chart that ensures adequate cool-down periods for the thermal head and which yet has no need to increase the space between patches.

What is claimed is:

1. A density calibration chart comprising:

color patches on which densities from the shadow to the highlight are printed in a density order, wherein the printed color patches are arranged in a check pattern.

2. The density calibration chart according to claim 1, wherein the color patches are arranged on a plurality of columns for a color, and color patches of sequent density level are arranged on different columns.

3. The density calibration chart according to claim 2, wherein the color patches are alternately arranged with a space containing no color patch in both a horizontal and column direction.

4. A method of correcting density gradation comprising a step of: performing density calibration using a density calibration chart including color patches on which densities from the shadow to the highlight are printed in decreasing order wherein the printed color patches are arranged in a check pattern.

5. A color printer comprising:

a density calibration table which prints a density calibration chart including color patches on which densities from the shadow to the highlight are printed in decreasing order, and the printed color patches are arranged in a check pattern.

* * * * *